(12) United States Patent
Kuntze

(10) Patent No.: US 7,001,128 B2
(45) Date of Patent: Feb. 21, 2006

(54) TWO PART INTERLOCKING FASTENER FOR ATTACHING PANELS TO A VEHICLE

(75) Inventor: Christopher J. Kuntze, Clarkston, MI (US)

(73) Assignee: Decoma International Inc., Concord (CA)

( * ) Notice: Subject to any disclaimer, the term of this patent is extended or adjusted under 35 U.S.C. 154(b) by 0 days.

(21) Appl. No.: 10/663,315

(22) Filed: Sep. 16, 2003

(65) Prior Publication Data

US 2004/0091332 A1    May 13, 2004

Related U.S. Application Data

(60) Provisional application No. 60/411,238, filed on Sep. 16, 2002.

(51) Int. Cl.
F16B 19/00    (2006.01)

(52) U.S. Cl. .............................. 411/508; 24/297; 24/458

(58) Field of Classification Search .................. 411/41, 411/45–48, 901–903, 508–510, 913; 24/297, 24/453, 457, 458, 289; 16/2.1, 2.2
See application file for complete search history.

(56) References Cited

U.S. PATENT DOCUMENTS

| | | | | |
|---|---|---|---|---|
| 2,358,206 A * | 9/1944 | Boersma | ..................... | 52/716.5 |
| 2,936,015 A * | 5/1960 | Rapata | ..................... | 411/182 |
| 2,941,439 A * | 6/1960 | Rapata | ..................... | 411/41 |
| 3,065,342 A * | 11/1962 | Worden | ..................... | 362/390 |
| 3,078,064 A * | 2/1963 | Turnbull | ..................... | 248/239 |
| 3,153,975 A * | 10/1964 | Rapata | ..................... | 24/295 |
| 3,193,895 A * | 7/1965 | Oxley | ..................... | 439/597 |
| 3,534,797 A * | 10/1970 | Haug et al. | ..................... | 411/108 |
| 3,650,173 A * | 3/1972 | Mathe | ..................... | 411/45 |
| 4,420,859 A | 12/1983 | Hammerle | | |
| 4,883,382 A | 11/1989 | Mushya | | |
| 4,938,645 A | 7/1990 | Wollar | | |
| 5,007,779 A | 4/1991 | Goran | | |
| 5,011,356 A | 4/1991 | Fernandez | | |
| 5,036,674 A * | 8/1991 | Chang | ..................... | 62/77 |
| 5,039,267 A | 8/1991 | Wollar | | |
| 5,217,337 A * | 6/1993 | Junemann et al. | ..................... | 411/45 |
| 5,387,065 A * | 2/1995 | Sullivan | ..................... | 411/48 |
| 5,542,158 A * | 8/1996 | Gronau et al. | ..................... | 24/295 |
| 5,647,713 A | 7/1997 | Ge et al. | | |
| 5,857,728 A * | 1/1999 | Crotty, III | ..................... | 296/97.9 |
| 6,048,147 A * | 4/2000 | Arisaka et al. | ..................... | 411/48 |
| 6,443,679 B1 * | 9/2002 | Schwarz | ..................... | 411/352 |
| 6,454,503 B1 * | 9/2002 | Polic et al. | ..................... | 411/45 |
| 6,524,316 B1 * | 2/2003 | Nicholson et al. | ..................... | 606/72 |

* cited by examiner

Primary Examiner—Flemming Saether
(74) Attorney, Agent, or Firm—Clark Hill PLC

(57) ABSTRACT

A fastener assembly has a two part fastener and a pin. The two part fastener interlocks with each other for mounting on a vehicle and sandwiching at least two panels therebetween. The two part fastener has an aperture extending therethrough. The pin interlocks with the two part fastener for mounting a sandwiching at least one other panel to the first two panels.

2 Claims, 2 Drawing Sheets

TWO PART INTERLOCKING FASTENER FOR ATTACHING PANELS TO A VEHICLE

RELATED APPLICATION

This application claims priority to and all the benefits of U.S. Provisional Application No. 60/411,238, filed on Sep. 16, 2002.

FIELD OF INVENTION

This invention relates to a fastener for attaching a plurality of layered panels. In particularly, this invention relates to a fastener for optionally attaching a paneled accessory such as a wheel flares to a vehicle panel.

BACKGROUND OF INVENTION

Vehicle manufacturers are offering custom versions of certain vehicles. The custom version will be offered with special features such as running boards, mud guards and special trim. These special features must be added to the vehicle once assembly has been completed. Since the various custom components are added after normal assembly, the custom parts must not interfere with regular parts and fasteners.

On larger SUV type vehicle, the fender has a wheel opening. The wheel opening will have a flange on which a wheel well liner mounts. A series of conventional fasteners such as rivets attach the liner to the flange. If a custom package is added, such package sometimes includes wheel flares. The flares mount to the outside of the vehicle but attaches to the same flange as the wheel liner.

In the prior art, the same fasteners or even fastener locations cannot be utilized to fasten the flares to the fender flange. The flare attachments must be designed to have attachment points different from the shell attachment points. Additional holes must be provided in the flange to accommodate the additional fasteners. Not only does this method of attachment increase costs, but also presents a "wavy" condition along the attachment, which condition is not desirable.

SUMMARY OF THE INVENTION

The disadvantages of the prior art may be overcome by providing a fastener that attaches two planar sheets together and optionally can fasten a third sheet to the first two planar sheets.

According to one aspect of the invention, there is provided a fastener having a first sleeve having a flanged end, a second sleeve with a flanged end. The first sleeve interlocks with the second sleeve. A pin has a head and a shaft. The pin interlocks within the first sleeve.

According to another aspect of the invention, there is provided a fastener assembly comprising a two part fastener and a pin. The two part fastener interlocks with each other for mounting to the vehicle and sandwiching a panel therebetween. The two part fastener has an aperture. The pin is inserted through the aperture of the two part fastener to interlock therewith sandwiching at least one other panel to the at least two panels.

DESCRIPTION OF THE DRAWINGS

In drawings that illustrate the embodiments of the present invention.

DESCRIPTION OF THE INVENTION

Figure 1:
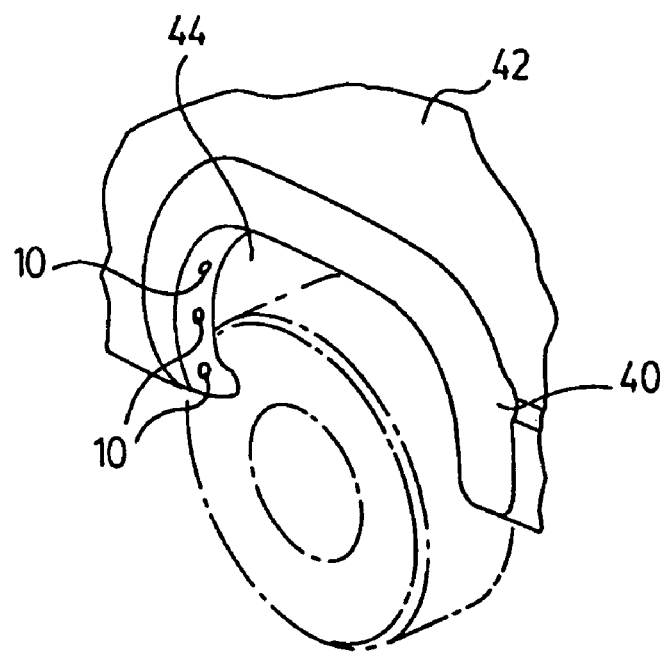
FIG. 1 is a partial perspective view of a wheel flare attached to a vehicle utilizing fasteners of the present invention.

Referring to FIG. 1, a fastener assembly 10 of the present invention is illustrated. The fastener assembly 10 is illustrated attaching a paneled accessory such as a wheel flare 40 mounted to a vehicle fender or body panel 42, with a wheel well liner 44 mounted to an inner face of fender 42.

Figure 2:
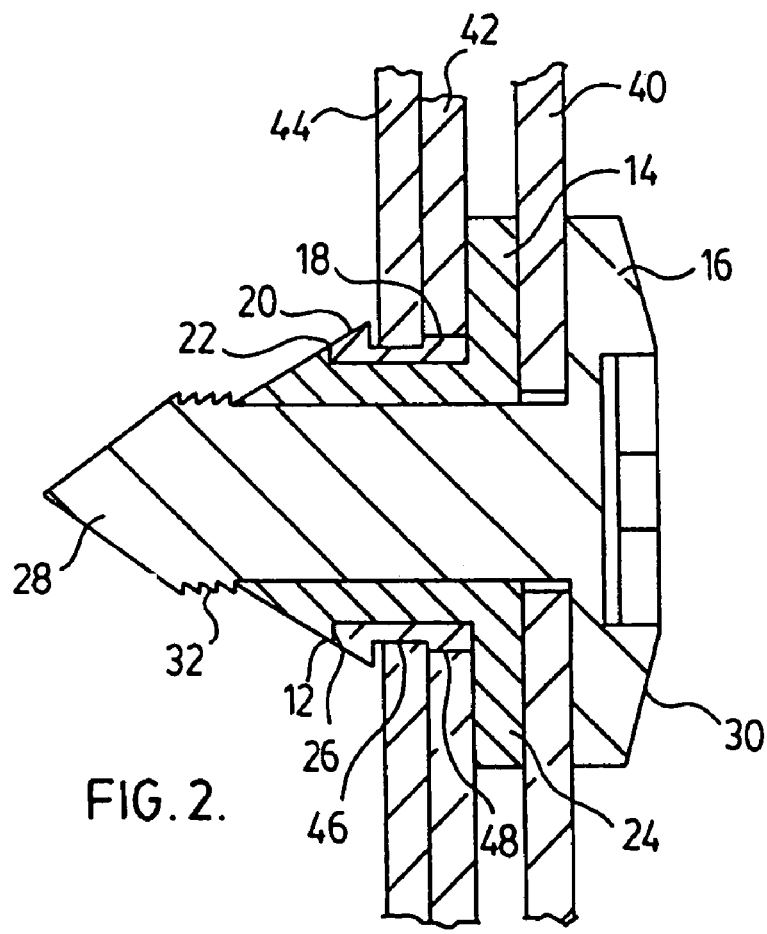
FIG. 2 is a side sectional view of the fastener assembly of the present invention.
Figure 3:
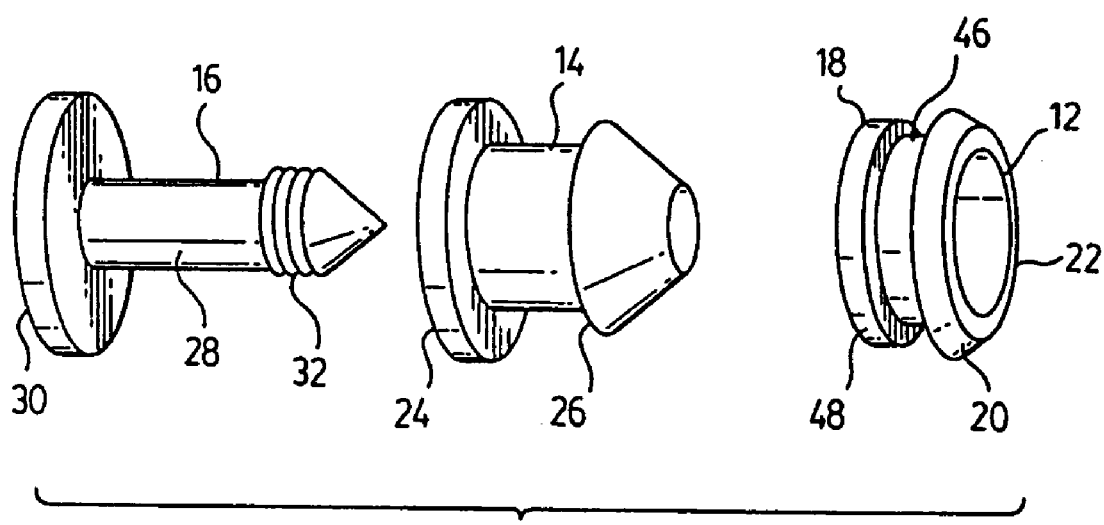
FIG. 3 is an exploded perspective view of the fastener assembly of the present invention.

Referring to FIG. 2, the fastener assembly 10 generally comprises a two part fastener 12, 14 and a pin 16. The two part fastener generally has a first sleeve or grommet 12 and a second sleeve 14.

The first sleeve 12 is generally a hollow cylinder having an annular flange 18 at one end. The outside of the sleeve 12 has a barb 20. The inside of the sleeve 12 has an inner annular channel 22.

The second sleeve 14 is a generally hollow cylinder having an annular flange 24 at one end. The inside of the sleeve 14 has a barb 26. Barb 26 is complementary to channel 22 of first sleeve 12 enabling second sleeve 14 to be inserted through the first sleeve 12 to interlock with the first sleeve 12 in a snap fit. Preferably, the interlock engagement holds two panels together.

The pin 16 has a shaft 28 and a head 30. Shaft 28 has a diameter that will slidingly fit within the inside diameter of the second sleeve 14. The distal end of shaft 28 has a series of barbs 32. Barbs 32 engage the distal tip of second sleeve 14 to interlock therewith in a snap fit.

It is apparent to those skilled in the art that, although the present invention illustrates an interlock means having a snap fit, the interlock means of the present invention also includes other forms of interlocks, including threaded engagement, twist locks, etc.

On the assembly line, the wheel well lining 44 is presented to the flange of the fender 42. Both the wheel well lining 44 and the flange will have apertures that are aligned. Sleeve 12 is fitted within aperture 46 of liner 44. Sleeve 14 is inserted through aperture 48 of fender 42. In the preferred embodiment, apertures 48 of the fender 42 are larger than the apertures 46 of the wheel liner enabling a small amount of relative movement therebetween. When the holes 46, 48 are aligned, sleeve 14 is presented to sleeve 12. The sleeve 14 snappingly engages with sleeve 12 to interlock therewith, sandwiching the wheel lining 44 to the flange of fender 42.

If a wheel flare 40 is to be attached, the wheel flare 40 is provided with apertures that align with the apertures of the wheel well lining 44 and the fender 42. The wheel flare 40 is aligned and pin 16 is inserted therethrough. Pin 16 snappingly engages the sleeve 12 to interlock therewith and sandwich the wheel flare to the flange of fender 42.

If a wheel flare 40 is not included in the vehicle, conventional caps or pins 16 may be inserted in each of the two part fasteners to close the open end of sleeve 14.

The above-described embodiment of the invention is intended to be an example of the present invention and alterations and modifications may be effected thereto, by those of skill in the art, without departing from the scope of the invention, as defined by the appended claims.

What is claimed is:

1. A fastener assembly for attaching a paneled accessory to a vehicle, said fastener assembly comprising:
   a two part fastener that interlocks with each other for mounting on the vehicle, said two part fastener comprising a first sleeve having a first aperture extending between a annular flange at one end and a barb at an opposite end and a second sleeve having an elongated annular body defining a second aperture extending between an annular flange at one end and a barb at an opposite end wherein said second sleeve slidingly fits within said first aperture of said first sleeve and said barb of said second sleeve engages said opposite end of said first sleeve to interlock said first and second sleeve; and
   a pin having a shaft extending between a head at one end and a barb at an opposite end, wherein said pin is sized to slidingly fit within said second aperture of said second sleeve and said barb of said pin engages said opposite end of said second sleeve to interlock said pin and said two part fastener thereby sandwiching the paneled accessory to the vehicle.

2. A fastener assembly for attaching a first vehicle panel to a second vehicle panel, said fastener assembly comprising:
   a first sleeve having an annular outer peripheral channel recessed between an annular flange at one end and barb at an opposite end for receiving the first vehicle panel along said channel between said flange and said barb, said first sleeve including a first aperture extending between said ends;
   a second sleeve having an annular outer peripheral channel recessed between an annular flange at one end and a barb at an opposite end for receiving the second vehicle panel along said channel between said flange and said barb, wherein said second sleeve slidingly fits within said first aperture of said first sleeve and said barb of said second sleeve engages said opposite end of said first sleeve to interlock said first and second sleeve sandwiching the first and second vehicle panels therebetween, said second sleeve including a second aperture extending between said ends; and
   a pin having an elongated shaft extending between a head at one end and a barb at an opposite end for receiving a third vehicle panel therebetween, wherein said pin is sized to slidingly fit within said aperture of said second sleeve and said barb of said pin engages said opposite end of said second sleeve to interlock said pin and second sleeve and attach the third vehicle panel to the first and second vehicle panels.

* * * * *